(12) United States Patent
Finkle (10) Patent No.: US 8,294,389 B2
(45) Date of Patent: Oct. 23, 2012

(54) THERMALLY EFFICIENT LIQUID MOTION LAMP

(76) Inventor: Louis J. Finkle, Lakewood, CA (US)

( * ) Notice: Subject to any disclaimer, the term of this patent is extended or adjusted under 35 U.S.C. 154(b) by 279 days.

(21) Appl. No.: 12/870,798

(22) Filed: Aug. 28, 2010

(65) Prior Publication Data

US 2011/0050104 A1 Mar. 3, 2011

Related U.S. Application Data

(60) Provisional application No. 61/237,975, filed on Aug. 28, 2009.

(51) Int. Cl.
*G05F 1/00* (2006.01)
*H05B 37/02* (2006.01)
*H05B 39/04* (2006.01)
*H05B 41/36* (2006.01)

(52) U.S. Cl. ........... 315/309; 315/32; 315/117; 362/101

(58) Field of Classification Search .................. None
See application file for complete search history.

(56) References Cited

U.S. PATENT DOCUMENTS

| | | | |
|---|---|---|---|
| 3,387,396 A | 6/1968 | Smith | |
| 3,570,156 A | 3/1971 | Walker | |
| 4,419,283 A | 12/1983 | Schneider | |
| 5,778,576 A | 7/1998 | Kaviani | |
| 6,604,835 B2 | 8/2003 | Zale | |
| 6,681,508 B2 | 1/2004 | Unger et al. | |
| 6,746,131 B1 | 6/2004 | Goldstein et al. | |
| 7,137,720 B1 | 11/2006 | Finkle | |
| 7,478,914 B2 | 1/2009 | Finkle | |
| 7,645,049 B2 | 1/2010 | Finkle | |
| 2003/0202340 A1 | 10/2003 | Wu | |
| 2005/0183299 A1 | 8/2005 | Lee | |
| 2006/0215397 A1 | 9/2006 | Lee | |
| 2007/0246098 A1 | 10/2007 | Burke et al. | |
| 2007/0291472 A1 * | 12/2007 | Finkle | 362/101 |
| 2009/0102386 A1 * | 4/2009 | Finkle | 315/117 |

FOREIGN PATENT DOCUMENTS

GB 2399446 9/2004

* cited by examiner

*Primary Examiner* — Anh Tran
(74) *Attorney, Agent, or Firm* — Kenneth L. Green (57) ABSTRACT

A thermally efficient liquid motion lamp maintains the proper temperature of liquids within the lamp to provide desired motion while using a minimal amount of energy. The lamp includes a submerged heater and a second heater in the base of the lamp, and an efficient non-incandescent light source for illuminating liquids in the lamp. A sensor measures the temperature of the liquids inside the lamp and the control system controls the heaters to first heat the lamp to operating temperature using the submerged heater and to maintain the temperature within operating limits at the base of the lamp using the second heater. The non-incandescent light source is preferably an LED and may be multi-color or an Ultra Violet (UV) LED cooperating with UV dyes in the liquids, but may be any highly efficient light source. The color and intensity of the LED may be controlled to follow music.

19 Claims, 11 Drawing Sheets

THERMALLY EFFICIENT LIQUID MOTION LAMP

The present application claims the priority of U.S. Provisional Patent Application Ser. No. 61/237,975 filed Aug. 28, 2009, which application is incorporated in its entirety herein by reference.

BACKGROUND OF THE INVENTION

The present invention relates to decorative lighting and in particular to a thermally efficient liquid motion lamp.

Liquid motion lamps, commonly called "lava lamps", have been known since the 1960s. Such lamp is described in U.S. Pat. No. 3,387,396 for "Display Devices." The '396 patent describes a lamp having globules of a first liquid suspended in a second liquid, wherein the first liquid has a thermal expansion coefficient providing sufficient expansion, and therefore reduction in density, such that the first liquid is heavier than the second liquid at a lower temperature, and lighter than the second liquid at a higher temperature. The temperatures may be, for example, 45 degrees Centigrade and 50 degrees Centigrade. The first and second liquids are contained in a clear container having a heat source at the bottom, and as a result, the first liquid is heated, rises within the second liquid, cools, and drops back to the bottom of the container. At least one of the liquids is preferably colored, and provides an entertaining motion for an observer. Lamps such as described by the '396 patent are typically small and are sold as a sealed unit.

Unfortunately, known lamps often exhibit erratic behavior because of temperature fluctuations. The internal lamp temperature fluctuates with ambient temperature and the liquids fail to behave as intended. Further, high temperatures can cause the liquids to break down.

Recently, liquid motion lamps have gained popularity, and there is a desire to use such lamps in various commercial settings, for example hotel lobbies, clubs, lounges, etc. There is a desire that such lamps used in a commercial setting be substantially larger than known liquid motion lamps, but shipping such large lamps filled with liquid results in a high probability of damage and high shipping costs. U.S. Pat. No. 7,137,720 filed Jun. 1, 2004 by the present applicant discloses a liquid motion lamp which may be shipped dry, and filled with a liquid at it's final destination. The dry shipment thus makes large liquid motion lamps much more practical. However, such large lamps are being used in luxurious settings where the appearance of the motion in the lamps is very important, and the large lamps may not behave consistently due to temperature fluctuations, particularly with tall lamps, for example, over five feet high. If the temperature is not carefully controlled, the desired visual affects may not be achieved. For example, too high of temperatures may cause the first liquid to remain near the top of the container, and cause clouding. Too low of temperatures will result in the first liquid failing to rise a desired amount.

U.S. Pat. No. 7,478,914 for "Control System for Liquid Motion Lamp" describes a lamp with temperature sensors and two heating elements to control the temperature of liquids contained in the lamp. One heating element is an incandescent light in the base of the lamp producing both light and heat and the other heating element may be a submerged heating element, a heat blanket wrapped around the base of the liquid container, or other heating element. A sensor is provided to measure the temperature of the liquids inside the lamp and the control system controls both heaters to maintain the temperature within preferred operating limits. While the sensor, heating elements, and control system of the '914 patent address problems of known liquid motion lamps, the radiation from the incandescent light is mostly outside the visible spectrum and results in significant heating of the base of the lamp. Additionally, the incandescent light often generates more total energy than is needed to maintain the temperature of the liquids for proper operation, and over temperatures have resulted, reducing the life of chemicals in the liquids. Further, such liquid motion lamps are often used in crowded bars and lounges which are often at elevated temperatures, and the added heat generated by the incandescent light adds to the hot environment adding to the discomfort created by the heat and/or to air conditioning costs. Incandescent lights for a small commercial lamp (about 11 gallons of liquids) may require 250 watts of power and incandescent lights for a larger commercial lamp (about 22 gallons of liquids) may require 350 to 400 watts of power. Small consumer lamps (one to 3 gallons of liquids) generally use 100 watt incandescent lights which result in overheating the liquids in a hot room. Further, experiments have show remarkable effects when brighter lighting is used, but such brighter lighting produces too much heat using known incandescent lights. The incandescent lights may also have a short operating life and require frequent replacement. The '720 and '914 patents are herein incorporated in their entirety by reference.

BRIEF SUMMARY OF THE INVENTION

The present invention addresses the above and other needs by providing a thermally efficient liquid motion lamp which maintains the proper temperature of liquids within the lamp to provide desired motion while using a minimal amount of energy. In a preferred embodiment, the lamp includes a submerged heater and a second heater in the base of the lamp, and an efficient non-incandescent light source for illuminating liquids in the lamp. The second heater may be a heat pad, a heat blanket, or a resistive glass coating. A sensor measures the temperature of the liquids inside the lamp and a control system controls the heaters to first heat the lamp to operating temperature using the submerged heater and then to maintain the temperature within a desired temperature range using the second heater. The non-incandescent light source is preferably an LED light and may be an Ultra Violet (UV) LED light cooperating with UV dyes in the liquids, but may be any highly efficient light source. The LEDs may further be multi color and the color and intensity may be controlled to follow music.

In accordance with one aspect of the invention, there is provided a liquid motion lamp using a high efficiency non-incandescent light source and a separate heat source to reduce energy consumption by about 50 percent. The heat source is insulated to direct heat into the base of the lamp and not the surroundings. A additional higher power heat source may be provided for initially heating the liquids in the lamp.

In accordance with another aspect of the invention, there is provided a liquid motion lamp with a high efficiency non-incandescent light source. The high efficiency non-incandescent light source produces significantly greater light providing significantly enhanced visual effects in some surroundings. The high level of light produced by the high efficiency non-incandescent light source is not possible using incandescent lights because too much heat would result in raising the temperature of the liquids in the lamp and drastically reducing the useful life of the liquids.

In accordance with still another aspect of the invention, there is provided a liquid motion lamp including a container, a base portion, a first liquid suitable for residing in the container, a second liquid suitable for residing in the container, an efficient non-incandescent light source, a submerged heater for initial heating, a second heater in the base of the lamp for continuous operation, a temperature sensor, and a control system. The first liquid is a solid at room temperature, a liquid at a lower operating temperature, and a liquid at a higher operating temperature. The second liquid is a liquid at room temperature, and the first liquid has a lower density than the second liquid at the higher operating temperature and a greater density than the second liquid at the lower operating temperature. The base portion resides substantially below the container and the light source resides within the base portion. The submerged heater is configured to be in thermal cooperation with the second liquid when the lamp is initially heated and the second heater resides proximal to the base of the lamp proximal to a portion of the first liquid which has cooled and fallen to the base of the lamp. The sensor measures the temperature of the second liquid and the control system receives measurements from the sensor and controls the light source and the heaters.

In accordance with yet another aspect of the invention, there is provided a liquid motion lamp with high efficiency LED lighting. The LED lighting may be multi color and the color and intensity of the light produced by the LED lighting may be modulated to follow music. Further, the liquids in the lamp may be dyed using ultra violet dyes and the LEDs may be ultra violet LEDs to produce pleasing effects in a dark room.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Liquid motion lamps, or lava lamps, are well known as small home decorative lighting. U.S. Pat. No. 3,387,396 for "Display Devices," U.S. Pat. No. 3,570,156 for "Display Devices," and U.S. Pat. No. 5,778,576 for "Novelty Lamp," describe such lamps. A detailed description of liquids used in such lamps is provided in U.S. Pat. No. 4,419,283 for "Liquid compositions for display devices." Construction of a large liquid motion lamp is disclosed in U.S. Pat. No. 7,137,720 filed Jun. 1, 2004 by the present applicant. A control system for liquid motion lamps which maintains the proper temperature of liquids within the lamp to provide desired motion within the lamp is disclosed in U.S. Pat. No. 7,478,914 for "Liquid Motion Lamp with Temperature Control System" filed Nov. 28, 2006 by the present applicant. The liquid motion lamps are filled with two liquids, a clear second liquid and a colored first liquid which moves in the second liquid to provide a liquid motion. The '396, '156, '576, and '283 patents are herein incorporated in their entirety by reference. The '720 and '914 patents were incorporated by reference above.

Although basic home lava lamps have become commonplace, large versions for commercial use have not been entirely practical for various reasons. The liquid motion lamp 10 disclosed in the '720 patent and shown in FIG. 1A overcomes many of these obstacles. The liquid motion lamp 10 includes a top piece 12, a container 14, and a base portion 19 including a base cover 16 and a base flange 18. The container 14 is preferably transparent and more preferably made from boro silicate glass or any clear stable plastic, for example, acrylic or poly carbonate. The base cover 16 and base flange 18 are preferably made from cast aluminum. The container 14 preferably extends into the base portion 19, and preferably, at least part of the base portion 19 is below the bottom of the container 14. The top piece 12 comprises a round cover for the container 14 and a short cylindrical portion for positioning the top piece 12 on the container 14. The top piece 12 is preferably fabricated from the same material (e.g., aluminum) as the base cover 16 and the base flange 18, and preferably provides a moisture proof seal to the container 14.

Figure 5A:
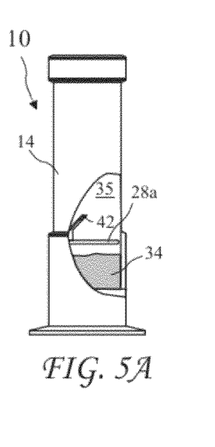
FIG. 5A shows the liquid motion lamp with a temperature sensor residing above a first liquid residing in the bottom of the container portion according to the present invention.
Figure 5B:
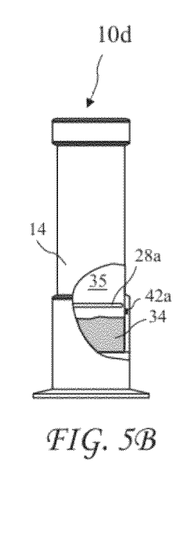
FIG. 5B shows the liquid motion lamp with a temperature sensor residing on an outer surface of the container according to the present invention.
Figure 5C:
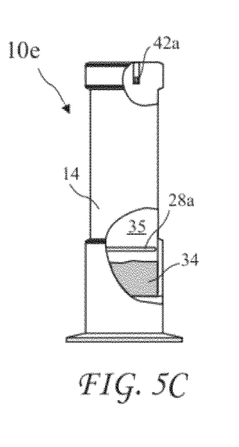
FIG. 5C shows the liquid motion lamp with a temperature sensor residing proximal to the top of the container according to the present invention.

The liquid motion lamp contains a heterogeneous mixture of a first liquid 34 and a second liquid 35 (see FIGS. 5A-5C). During operation, the liquids 34 and 35 are heated and motion of the liquid 34 in the liquid 35 results providing an entertaining visual effect. More specifically, the first liquid 34 has greater density than the second liquid 35 at room temperature. When heated to operating temperature, the first liquid 34 becomes less dense than the second liquid 35 and rises in the container 14, thereby creating liquid motion. As the first liquid 34 rises in the container 14, the first liquid 34 cools sufficiently to become more dense than the second liquid 35, and thus drops back to the bottom of the container 14 where the first liquid 34 is again heated. The lamp operates at between a preferred lower temperature T1 of approximately 110 degrees Fahrenheit and a preferred upper temperature T2 of approximately 120 degrees Fahrenheit.

An exemplar first liquid 34 is a paraffin based thermally expansive material, and preferably a combination of chlorinated paraffin and paraffin. The paraffin is preferably a low melting temperature paraffin, and more preferably a low oil content paraffin, and most preferably a less than three percent oil content paraffin, also known as a scale wax. The paraffin is preferably a low melting temperature paraffin to allow a low operating temperature for the lamp. A surfactant is preferably added to the container to reduce surface tension of the liquids, and a binder is preferably added to prevent the paraffin and chlorinated paraffin from separating. The surfactant is preferably a high cloud point surfactant.

The container 14 has a diameter D1 preferably between six inches and 36 inches, the base cover 16 has a diameter D2 preferably between approximately one inch and approximately two inches greater than the container diameter D1, and the base flange 18 has a diameter D3 preferably between approximately two inches and approximately twelve inches greater than the container diameter D1. The overall height H1 of the liquid motion lamp 10 is preferably between approximately three feet and approximately nine feet, and the height H2 of the portion of the container 14 above the base cover 16 is preferably between approximately two feet and approximately six feet. While the primary advantages of the present invention are directed to a large liquid motion lamp 10 having the preferred dimensions, any lamp including the heat and light sources and/or methods of the present invention described herein, is intended to come within the scope of the present invention. A perspective view of the liquid motion lamp 10 is shown in FIG. 1B.

Figures 2, 3A, 3B, 4:
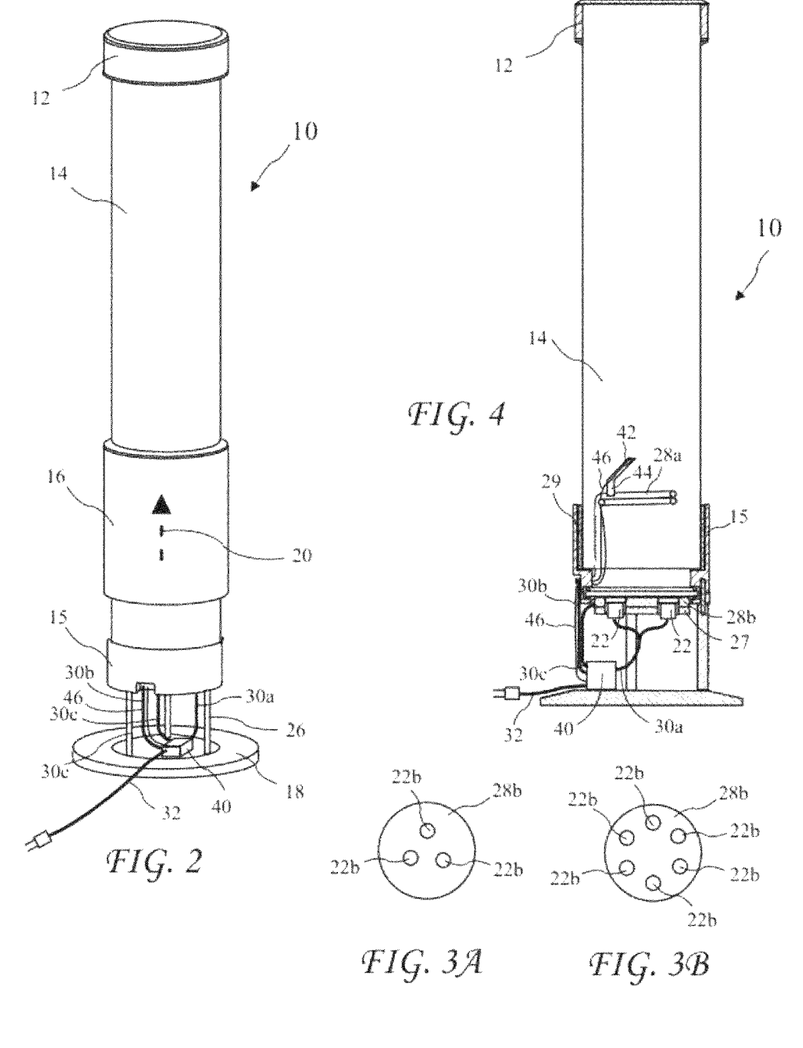
FIG. 2 shows the liquid motion lamp with a base cover raised to gain access to a lighting element, heating elements and a control system according to the present invention.
FIG. 3A shows a heating pad with three ports for high efficiency lighting sources.
FIG. 3B shows a heating pad with six ports for high efficiency lighting sources.
FIG. 4 shows a cross-sectional view of the liquid motion lamp taken along line 4-4 of FIG. 1A, showing the lighting element and the heaters according to the present invention.

A liquid motion lamp intended for use in a commercial setting, for example, hotel lobbies, clubs, lounges, etc., is preferably much larger and heavier than known lava lamps. As a result, it is not practical to lift or move the liquid motion lamp 10 to replace a light or heat source which has failed or to a adjust control circuit 40. To address replacement of the light or heat sources, the base cover 16 is vertically moveable along an arrow 20 as shown in FIG. 2. A container base 15 proximal to the bottom of the container 14 supports the container 14, and supports 26 support the container base 15 above the base flange 18. The supports 26 preferably comprise at least three vertical posts residing between the base flange 18 and the container base 15. With the base cover 16 raised, light sources 22 (see FIG. 4) and the control circuit 40 residing between the base flange 18 and the container base 15 are accessible. The light sources 22 are preferably energy efficient light sources and more preferably Light Emitting Diode (LED) light sources. The light sources 22 are electrically connected to the control circuit 40.

The liquid motion lamp 10 may include one or two heat sources. A first heat sources provides sufficient heat to initially heat the liquid motion lamp 10 to operating temperatures, and an optional second heat source may be included for sustained operation. The first heart source and second heat source are electrically connected to the control circuit 40 to receive electrical power converted to heat.

A preferred embodiment of the present invention including a first heat source comprising a submerged heat source 28a which is preferably a coil, and second heat source comprising a heating pad 28b with three ports 22b for high efficiency lighting sources is shown in FIG. 3A, and a heating pad 28b with six ports 22b for high efficiency lighting sources is shown in FIG. 3B. The heating pad 28b is one of three second heat sources described in more detail below. The ports 22b allow light from the high efficiency lighting sources to project into the container 14. A thermal insulator 27 (see FIG. 4) resides under the heating pad 28b and continues the ports 22b. In embodiments without the heating pad 28b under the container 14, the thermal insulator 27 may reside directly against a clear container bottom 14a (see FIG. 4A). The number of ports 22a may vary between one and ten as desired to illuminate the liquids in the container 14. Both the first heat source and the second heat source are preferably non-illuminating heat sources (i.e., provide no light to the liquids in the container).

Figure 1A:
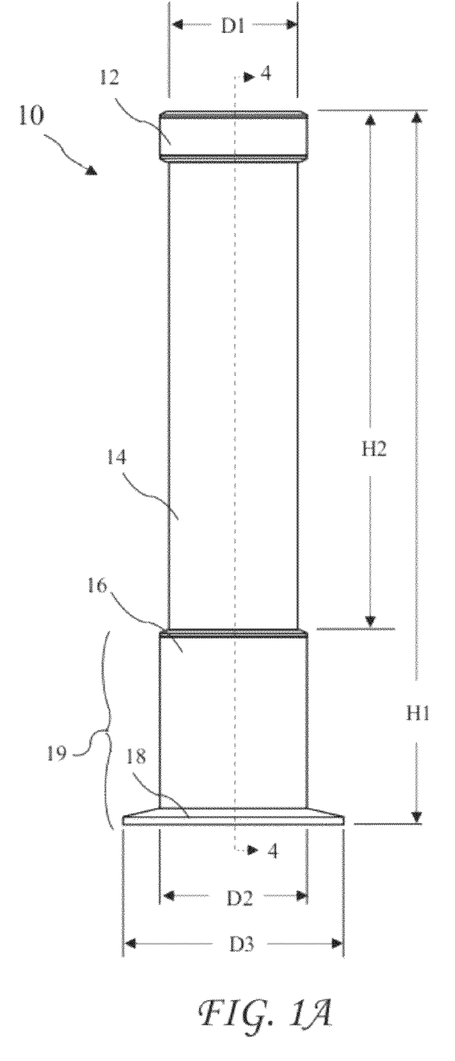
FIG. 1A is a side view of a liquid motion lamp according to the present invention.
Figure 1B:
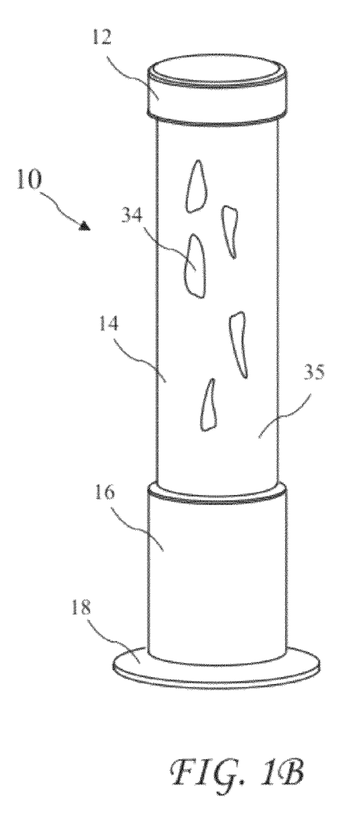
FIG. 1B shows a perspective view of the liquid motion lamp.
Figures 4A, 4B, 4C, 4D:
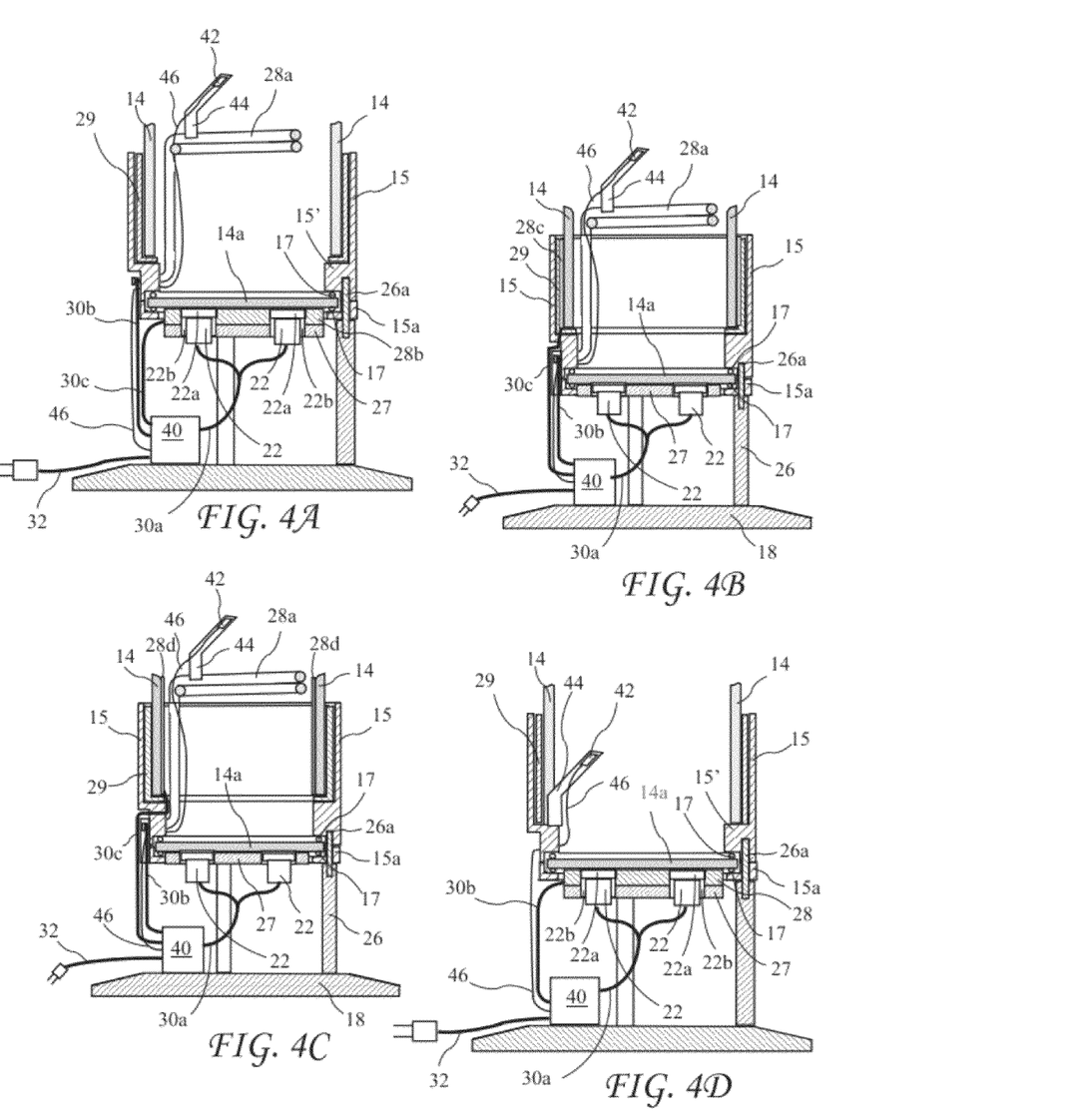
FIG. 4A is a detailed view of the bottom portion of the cross-sectional view of the liquid motion lamp taken along line 4-4 of FIG. 1, showing bottom sealing details and heaters comprising a submerged heater and a heat pad attached to the bottom of a liquid container, and high efficiency lighting sources reaching through ports in the heat pad and through a thermal insulator according to the present invention.
FIG. 4B is a detailed view of a bottom portion of the cross-sectional view of the liquid motion lamp taken along line 4-4 of FIG. 1A, showing the bottom sealing details and heaters comprising the submerged heater and a heat blanket residing around the exterior of the base of the container, and the high efficiency lighting sources reaching through ports in the thermal insulator according to the present invention.
FIG. 4C is a detailed view of a bottom portion of the cross-sectional view of the liquid motion lamp taken along line 4-4 of FIG. 1A, showing the bottom sealing details and heaters comprising the submerged heater and a resistive coating residing on the interior of the base of the container, and the high efficiency lighting sources reaching through the thermal insulator according to the present invention.
FIG. 4D is a detailed view of a bottom portion of the cross-sectional view of the liquid motion lamp taken along line 4-4 of FIG. 1A, showing the bottom sealing details and a single heater residing in the base of the lamp and the high efficiency lighting sources reaching through the thermal insulator according to the present invention.

A cross-sectional view of the liquid motion lamp 10 taken along line 4-4 of FIG. 1A is shown in FIG. 4 and a more detailed cross-sectional view of the liquid motion lamp 10 taken along line 4-4 of FIG. 1A is shown in FIG. 4A. The submerged heat source 28a resides inside the container 14. The heat source 28a is preferably, but not necessarily, raised above the resting place of a cooled first liquid 34 (see FIG. 5A) initially residing in the bottom of the container 14, which first liquid 34 is heavier than water and a solid at room temperature, still heavier than water but a liquid at a lower operating temperature T1, and lighter than water and liquid at a higher operating temperature T2. Electrical wires 30b connect the control circuit 40 to the submerged heat source 28a to provide power to the submerged heat source 28a. The submerged heat source 28a preferably comprises a heating coil inside the container 14, and the thermal sensor 42 is preferably supported by the sensor arm 44 attached to the submerged heat source 28a. The submerged heat source 28a is preferably substantially concealed (e.g., not visible from the side) when the base cover 16 is in place. The submerged heat source 28a is preferably a between 350 watts and 1,000 watts heater and more preferably a between 500 watts and 1,000 watts heater, the lower power heater for smaller lamps (about 8 inches diameter or about 11 gallons of liquids), and higher power heaters for a larger lamp (about 11 inches diameter or about 22 gallons of liquids).

A second heat source comprising the heat pad 28b is attached to the bottom of the clear container bottom 14a and a thermal insulator 27 is attached to the bottom of the heat pad 28b. The ports 22b (also see FIGS. 3A and 3B) are formed through both the heat pad 28b and thermal insulator 27 for the light sources 22. The ports 22b are preferably preformed in the heat pad 28b at the time of manufacture and are preferably about one inch in diameter. Lenses 22a reside in the ports 22b between the light sources 22 and the clear container bottom 14a to focus light from the light sources 22. The lenses 22a are preferably LED collimator lenses. The heat pad 28b is preferably between 130 watts and 150 watts for a smaller commercial lamp (approximately 8 inches diameter or about 11 gallons of liquids) and preferably about 200 watts for a larger commercial lamp (approximately 11 inches diameter or about 22 gallons of liquids). Small lamps for home use (about 1 to 3 gallons of liquids) may use a single 30 to 40 watt heat source. Electrical wires 30c connect the control circuit 40 to the heat pad 28b to provide power to the heat pad 28b. A suitable heat pad is made by Tempco in Anaheim, Calif.

The non-incandescent light sources 22 generally comprise between one and ten efficient light sources and preferably comprise between three and five efficient light sources (for example three to five LED light bulbs). Further, the light source 22 may be one or more Ultra Violet (UV) LED light sources and the liquids in the container 14 may be dyed using a UV dye to produce pleasing colors and motion. The first liquid 34 in the container 14 may be dyed using an oil soluble dye and a second liquid 35 in the container 14 may be dyed using a water base UV dye thereby retaining separation of colors during operation of the liquid motion lamp. The light sources 22 may further be multi color LEDs and the control circuit 40 may regulate power signals to the light sources 22 to provide changing color and intensity and the changes may be modulated to music.

The power requirements for the small lamp is about 50 watts total for the non-incandescent light sources 22, and about 100 watts for the large lamps to produce effects similar to know lamps with incandescent light sources. About ten watt non-incandescent light sources 22 are preferred for small home lamps. Further, experiments have shown that significantly improved visual effects have been observed by doubling the light output of the non-incandescent light sources to about 100 watts for the smaller lamps and 200 watts for the larger lamps. The non-incandescent light sources provide this effect using about the same or slightly more power than known incandescent light sources. The effects have not previously been achievable because of the heat generated by the use of incandescent light sources. A residential lamp may use a small as three to ten watts, and preferably about 3 watts per gallon of liquids.

While LED light sources are preferred, any high efficiency non-incandescent light source having efficiency similar to LED light sources may be used and any lamp according to the present invention with high efficiency non-incandescent light sources is intended to come within the scope of the present invention.

The thermal sensor 42 preferably resides inside the container 14 to measure the temperature of the liquids 34 and 35. The sensor 42 is preferably a Resistive Thermal Device (RTD) sensor, but may be any electronic, electro mechanical or non-contact infrared temperature or thermal optical device. An example of a suitable sensor 42 is an LM34 manufactured by National Semiconductor in Santa Clara, Calif. Another suitable sensor 42 is a series 5100 Hermetically Sealed Immersion-Type Thermostat made by Airpax in Frederick, Md.

The sensor arm 44 is preferably made from a thermally conductive material and is attached to the submerged heat source 28a to provide a thermally conductive path between the submerged heat source 28a and the thermal sensor 42. If the lamp is turned on without liquid in the lamp, the heating sensor 42 will be rapidly heated by heat conducted by the sensor arm 44, and an overheated condition may be detected and the lamp turned off before damage to the lamp occurs.

Although liquid motion lamps may function properly with a fixed amount of heat provided to the liquids, in general, the best visual effects are not obtained if the temperature of the liquids falls outside an intended temperature range. The temperature of the second liquid 35 at the base of the lamp must be high enough to heat the first liquid 34 to a temperature where the first liquid 34 is in a liquid phase and the density of the first liquid 34 is less than the density of the second liquid 35 so that the first liquid 34 rises to near the top of the container, and the temperature of the second liquid 35 at the top of the container must be low enough to cool the first liquid 34 to a temperature where the density of the first liquid 34 is greater than the density of the second liquid 35 so that the first liquid 34 falls proximal to the bottom of the container 14. If the temperature of the second liquid 35 in the base is low, the first liquid 34 will not be heated sufficiently to rise proximal to the top of the container 14, and if the temperature of the second liquid 35 in the top of the container 14 is too high, the first liquid 34 will remain proximal to the top of the container 14. In particularly, in large and/or tall lamps, the temperature of the second liquid 35 must be carefully controlled to maintain proper behavior of the first liquid 34.

To provide the desired behavior of the first liquid 34, the liquid motion lamp 10 according to the present invention includes the control circuit 40. The control circuit 40 may reside in the base of the lamp (see FIGS. 4-4D), or be located outside the lamp (see FIG. 4E). The control circuit 40 is preferably a programable control circuit 50 as described in FIGS. 7-11B, however, the control circuit may simply comprise a variable resistance sensor, for example a bi-metal device, and relays controlled by the variable resistance sensor to control the heat sources 28a, 28b, 28c, and 28d (see FIGS. 4 and 4A-4C).

Sensor wires 46 electrically connect the sensor 42 to the control circuit 40 providing temperature measurements. Wires 30a provide power to the lighting elements 22 and wires 32 provide electrical power to the control circuit 40.

Additionally, FIGS. 4A-4C show bottom sealing details of the lamp. The base 15 surrounds and supports the bottom of the container 14. The container base 15 includes a shelf 15' reaching under a lower edge of the container 14 to provide vertical support. A sealing material 29 resides between vertical walls of the base 15 and the container 14, and between the bottom edge of the container 14 and the shelf 15'. The base 15 cooperates with a base ring 15a to sandwich the container bottom 14a. Seals, which are preferably O-rings 17, reside between the bottom 14a and the base 15 and between the bottom 14a and the base ring 15a. The supports 26 (see FIG. 2) are preferably attached to the base 15 using support studs 26a, passing through the base ring 15a, thereby joining the base ring 15a to the base 15, and compressing O-rings 17. The container bottom 14a is preferably fabricated from a transparent material to pass light from the light source 22 into the container 14, and the container bottom 14a is more preferably made from the same material as the container 14. A recess 15c in the base 15 and base ring 15a provide space for the wires 30b and 46 to pass downward inside the base cover 16.

A detailed view of a bottom portion of the cross-sectional view of a liquid motion lamp taken along line 4-4 of FIG. 1A is shown in FIG. 4B, with a second heat source comprising a heat blanket 28c. The blanket 28c preferably resides between the base 15 and the container 14, and is preferably potted in the sealant 29. The lamp of FIG. 4B is otherwise similar to the lamp 10.

A detailed view of a bottom portion of the cross-sectional view of a liquid motion lamp 10b taken along line 4-4 of FIG. 1A is shown in FIG. 4C, with a second heat source comprising a resistive coating 28c on the interior of the container 14. The lamp of FIG. 4C is otherwise similar to the lamp 10.

A detailed view of a bottom portion of the cross-sectional view of a liquid motion lamp 10b taken along line 4-4 of FIG. 1A is shown in FIG. 4D, with a single heat source in the base of the lamp. While a higher wattage submerged heater is preferred for initial heating, a single lower wattage heater in the base of the lamp may be suitable in some commercial applications and for smaller residential lamps. The single heat source may be a heat pad under the container, a heat blanket wrapped around the base of the container, a resistive coating inside the base of the container, or any other single heater heating primarily the base of the container. The lamp of FIG. 4D is otherwise similar to the lamp 10.

Another embodiment of the lamp 10 includes a microwave heater in the base of the lamp. For safety, the microwaves are contained in a shielded volume in the base of the lamp, and the second liquid 35 is free to flow through the shielded volume and a flow is created by convection or by a propeller.

Figure 4E:
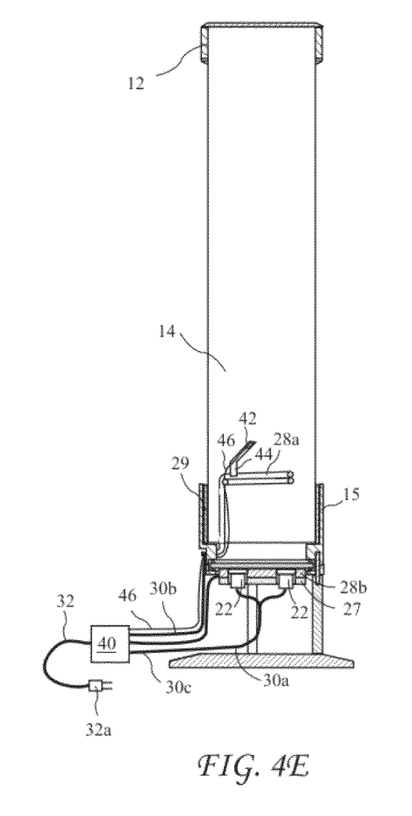
FIG. 4E shows the liquid motion lamp according to the present invention with an external control connected to the lamp by wiring.

A detailed cross-sectional view of a liquid motion lamp 10c taken along line 4-4 of FIG. 1A is shown in FIG. 4E, with the control circuit 40 residing outside the liquid motion lamp 10. The control circuit 40 may reside at any distance from the lamp which is compatible with the power requirements of the heater and with the sensor signal from the sensor 42, and wherein the heater wires 30b do not have excessive resistance. The liquid motion lamp 10b is otherwise similar to the liquid motion lamp 10. Additionally, a temperature sensor may be attached to a remote control circuit 40, at any point along the wires 32, or at the plug 32a, and the temperature of the liquids 34 and 35 may be estimated based on a measurement of ambient temperature in the area the lamp is located in.

When the liquid motion lamp 10 is in use, the container 14 is substantially filled with two immiscible liquids forming a heterogeneous mixture. The liquid motion lamp 10 is shown in cut-away in FIG. 5A with the first liquid 34 residing in the bottom of the container 14, which first liquid 34 is preferably a solid at room temperature and preferably resides behind the base cover 16 when solidified, and is preferably below the submerged heat source 28a when solidified. The second liquid 35 is preferably liquid at room temperature and more preferably comprises water. The sensor 42 is seen attached to the submerged heat source 28a and residing in the second liquid 35.

A liquid motion lamp 10d including a surface mounted temperature sensor 42a is shown in FIG. 5B. The sensor 42a is preferably mounted on an outside surface of the container 14 and positioned behind the base 15. When such sensor 42a is used, the temperature measurements are slightly lower (for example, approximately five degrees Fahrenheit) than the measurements made by a senor immersed in the second liquid 35 and using the submerged heat source 28a, and may be slightly higher than the measurements made by sensor immersed in the second liquid 35 and using the heat blanket 28b or the resistive coating 28c. Temperature settings for the control circuit 40 are adjusted accordingly.

A liquid motion lamp 10e with the temperature sensor 42 residing proximal to the top of the container 14 is shown in FIG. 5C. The surface mounted sensor 42a may similarly be mounted inside the cylindrical portion 12b (see FIG. 4).

Figure 6A:
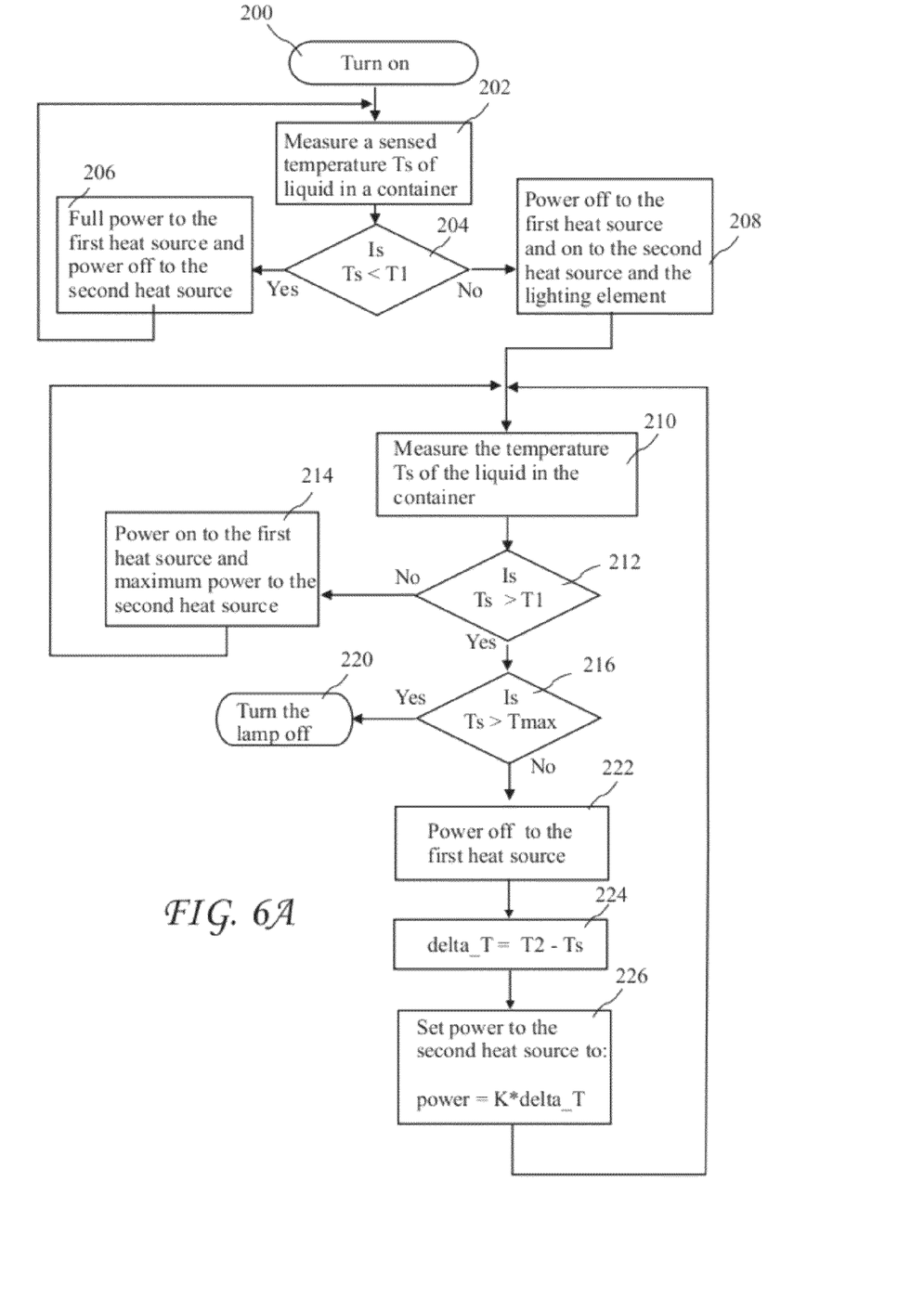
FIG. 6A describes a method according to the present invention for controlling the liquid motion lamp having a high efficiency light source and two heaters.

A method for controlling the liquid motion lamp 10 is described in FIG. 6A. The liquid motion lamp is turned on at step 200. The sensor temperature Ts of the liquid in the container is measured at 202. Ts is compared to a preferred lower temperature T1 at step 204. If Ts is less than T1, full power is provided to the first heat source and power is turned off to the second heat source at step 206, and the control logic returns to step 202 to again measure the temperature Ts. If Ts is not less than T1, the first heat source is turned off, and a second heat source in the base of the lamp and a high efficiency lighting element are turned on at step 208. The temperature Ts is again measured at step 210. The sensor temperature Ts is again compared to the temperature T1 at step 212. If Ts is less than T1, power is again provided to the first heat source and maximum power is provided to a second heat source at step 214. If Ts is not less than T1, the temperature Ts is compared to a maximum operating temperature Tmax at step 216. If Ts is greater than Tmax, the lamp is turned off at step 220. If Ts is less than Tmax, power is removed from the first heat source at step 222, a delta_T between Ts and T2, a maximum preferred operating temperature, is computed at step 224, and the power provided to the second heat source is computed as a constant K times delta_T at step 226. If the computed power to the second heat source is negative, zero power is provided to the second heat source.

Figure 6B:
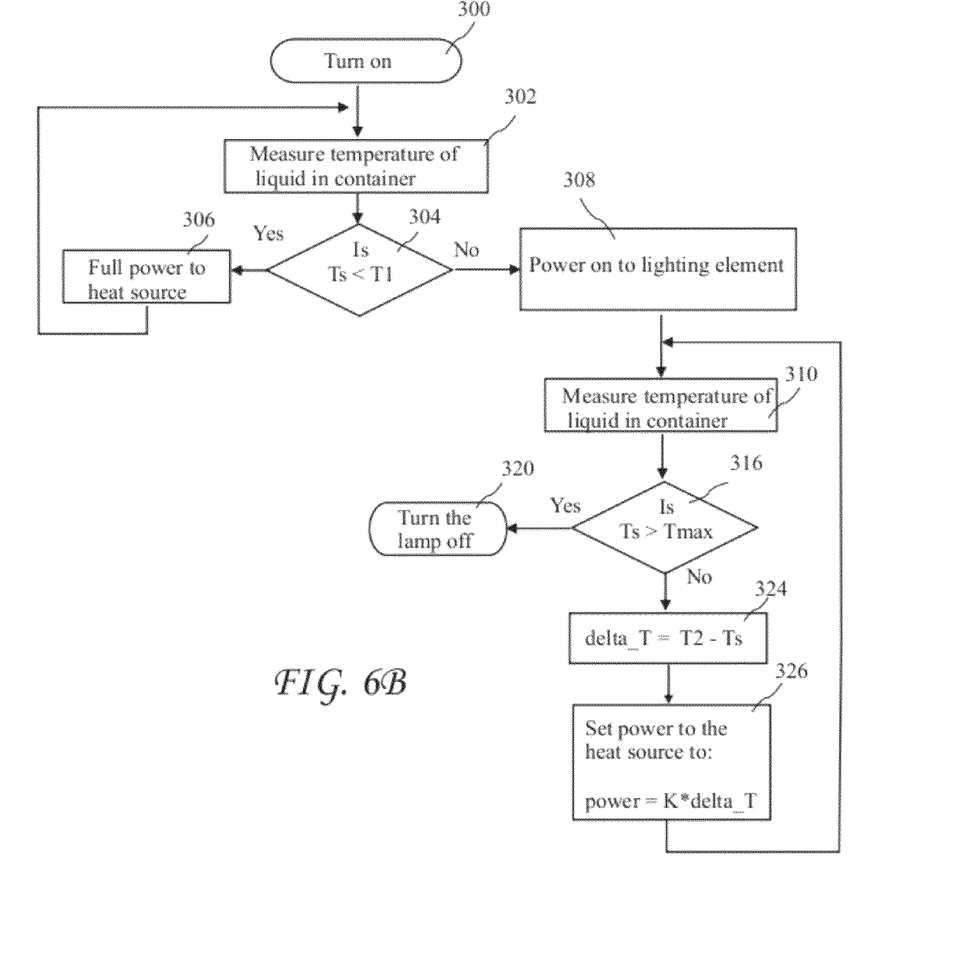
FIG. 6B describes a method according to the present invention for controlling the liquid motion lamp having a high efficiency light source and one heater.

A second method for controlling a small or residential liquid motion lamp is described in FIG. 6B. The liquid motion lamp is turned on at step 300. The sensor temperature Ts of the liquid in the container is measured at 302. Ts is compared to a minimum preferred temperature T1 at step 304. If Ts is less than T1, full power is provided to the heat source at step 306, and the control logic returns to step 302 to again measure the temperature Ts. If Ts is not less than T1, a high efficiency lighting element is turned on at step 308. The temperature Ts is again measured at step 310. The sensor temperature Ts is compared to the maximum temperature Tmax at step 316. If Ts is greater than Tmax, the liquid motion lamp is turned off at step 320. If Ts is less than Tmax, a delta_T between Ts and T2, a maximum preferred operating temperature, is computed at step 324, and the power provided to the heat source is computed as a constant K times delta_T at step 326. When Ts is greater then T2, power is removed from the heat source.

Another embodiment of the lamp is directed to a low cost product and does not include a temperature sensor and/or a submerged heater. The low embodiment utilizes a constant power level to a heater in the base of the lamp, and high efficiency lighting, and preferably LED lighting. The combination of the heater and high efficiency lighting reduces the overall energy consumption by 50 percent or more, thereby providing a very efficient lamp.

The temperature control methods regulate the liquids in the container to reach and maintain a temperature within a range preferred for the general operating temperature of the liquid motion lamp. In general, the lower the temperature, the less chemical reactions that occur and at higher temperatures, for example, above 120 degrees Fahrenheit, a slow but continual break down of both the first liquid (generally a wax and its constituent components) and the surfactant and additives which reside in the water phase of said display takes place. The basic function of the lamp operates on the expansion and contraction of heated first liquid 34. The hotter the first liquid 34 (and second liquid 35), the greater tendency of the said first liquid 34 to rise, and in some cases, stay at top of said lamp. Too low of a temperature creates a stall condition and the first liquid 34 will remain at the bottom of the lamp, and in some cases, re-solidify into a non-flowing solid.

Preferably, the minimum preferred temperature T1 is approximately 110 degrees Fahrenheit and the maximum preferred temperature T2 is approximately 120 degrees Fahrenheit. Thus, K is preferably 0.1 so that the power to the heating element decreases linearly from maximum power at the minimum preferred temperature T1 to zero power at the maximum preferred temperature T2, and when T2−Ts is negative, the power to the heating element is turned off. The maximum operating temperature Tmax is preferably approximately 140 degrees Fahrenheit.

In some embodiments, the maximum preferred temperature T2 is adjustable to allow tuning the temperature of the lamp. In these adjustable embodiments, T2 is preferably adjustable between 110 and 120 degrees Fahrenheit. Setting T2 to 115 degrees Fahrenheit has shown good results and is a recommended trial setting for T2.

Heating the second liquid initially as described in steps 202-206 preferably heats the second liquid first and the heat source is not in direct contact with the first liquid because heating the first liquid first may result in undesired cooperation of the first liquid and the second liquid.

The methods described in FIGS. 6A and 6B may be performed with an arrangement of bi-metal strip temperature sensors and relays, with an off the shelf programable controller, or with a custom programable circuit. An example of a suitable off the shelf controller is the model CT15 controller made by Minco Products, Inc. in Minneapolis, Minn.

Figure 7:
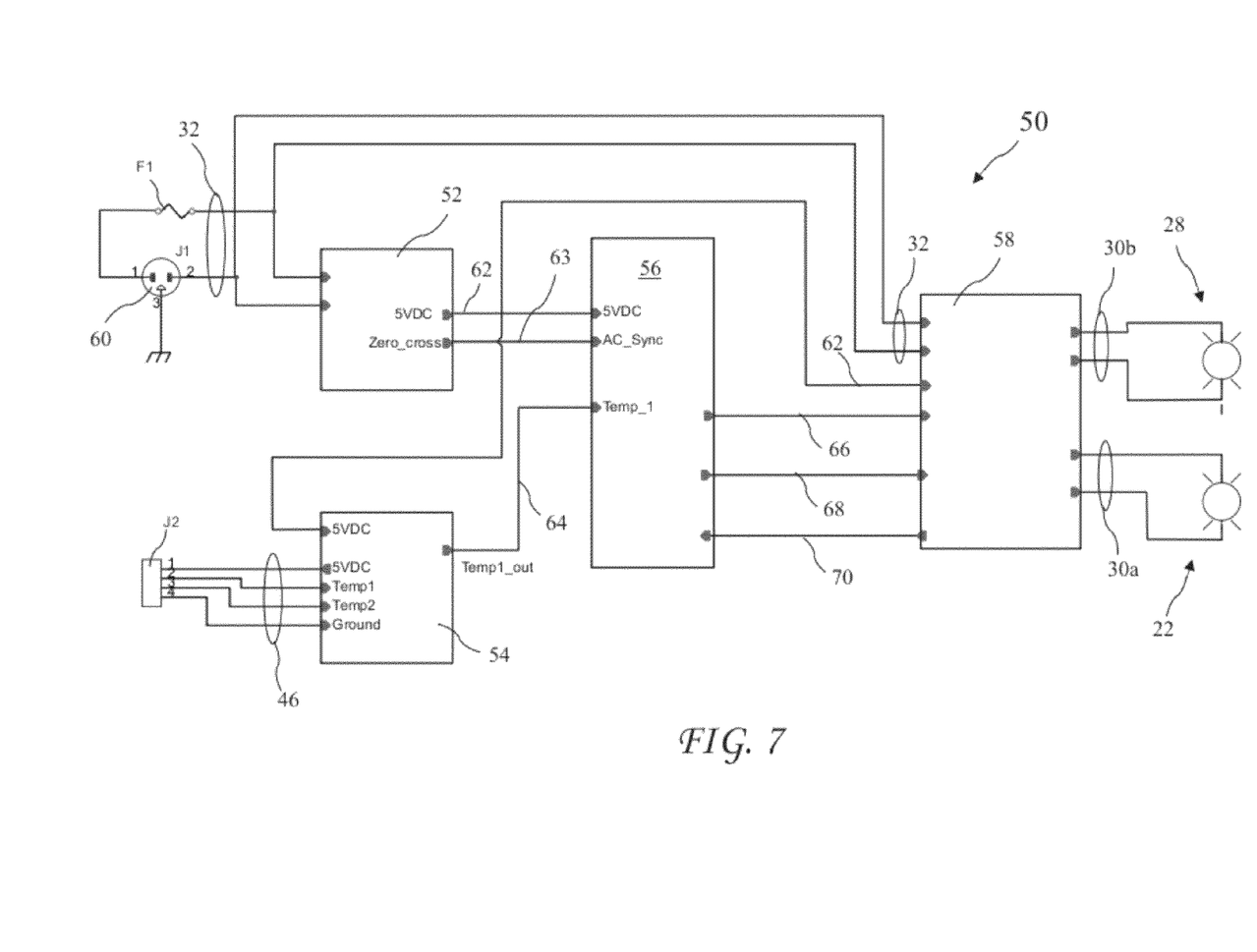
FIG. 7 is a high level view of a control circuit for the liquid motion lamp.

A high level view of a custom control circuit 50 for the liquid motion lamp is shown in FIG. 7. The circuit 50 includes a power supply 52, a sensor data processor 54, a micro controller circuit 56 and a power controller 58. The power controller 58 preferably includes at least one triac for regulating a flow of current to the heater and light. Household or commercial AC power (for example, either 120 volt or 240 volt) is provided to the circuit 50 through wires 32. The power supply 52 receives the AC power through the wires 32 (see FIGS. 4, 4A, 4B, 4C, and 4D) connected to an AC plug 60, and one of the wires 32 may include an in-series fuze F1. The power supply 52 provides a 5 volt DC power signal 62 to the micro controller circuit 56 and to the sensor data processor 54 and a zero cross signal 62 to the micro controller circuit 56.

The sensor data processor 54 provides 5 volt DC power to the temperature sensor 42 and a ground connection, and receives a first temperature signal T1 from the sensor 42 through a second connector J2. A second temperature signal T2 may optionally be received through the connector J2. The sensor data processor 54 provides a temperature measurement signal 64 to the micro controller circuit 56.

The power controller 58 receives the AC power from the AC plug 60 and also receives a heater control signal 66 and a lighting control signal 68 from the micro controller circuit 56. A current feedback signal 70 representing the current provided to the heater 28 or the light 22 is provided to the micro controller circuit 56 from the power controller 58. The power controller 58 provides power to the light 22 through wires 30a and to the heater 28 through wires 30b.

Figure 8:
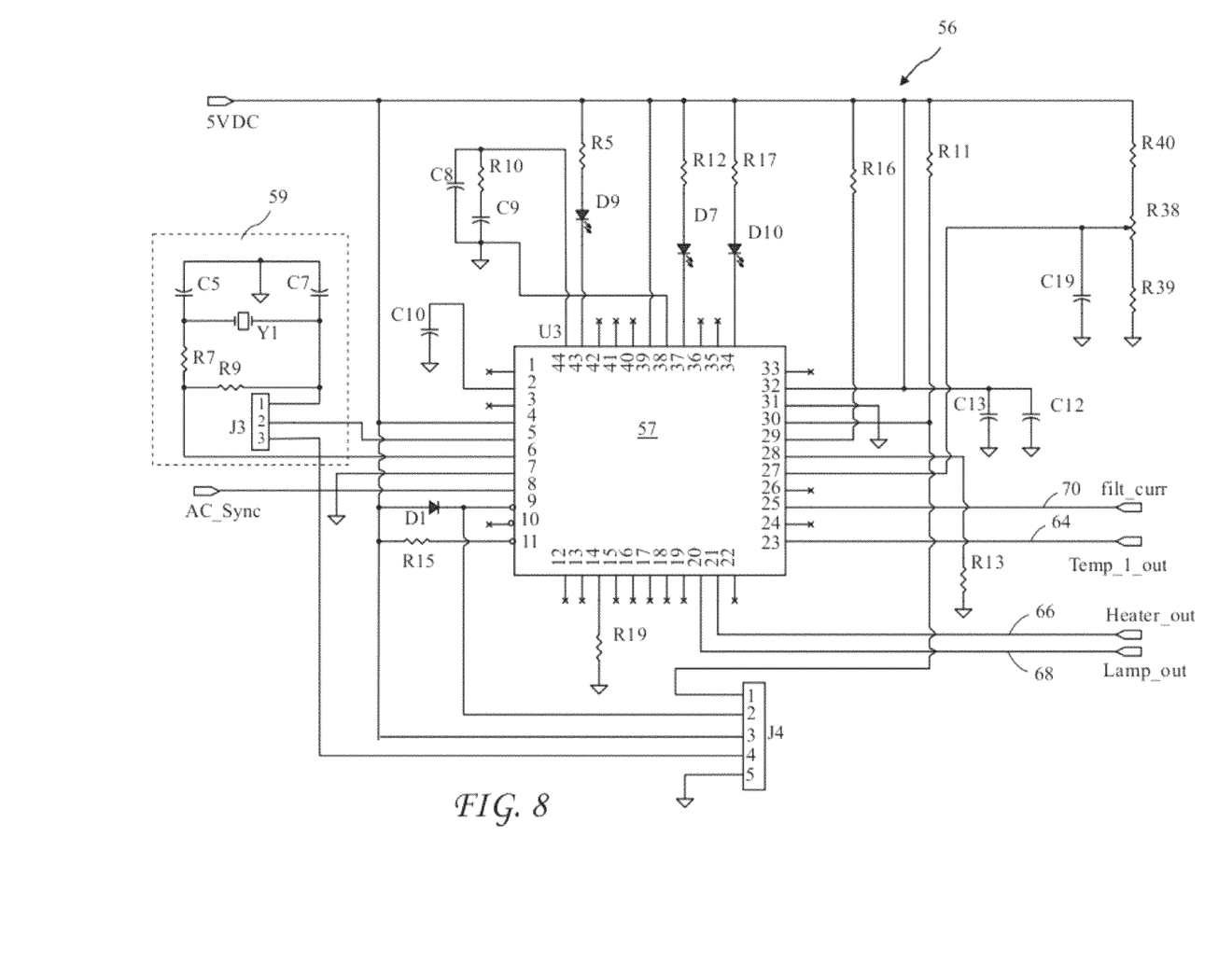
FIG. 8 is a micro controller element of the control circuit.

A detailed diagram of the micro controller circuit 56 of the control circuit 50 is shown in FIG. 8. The micro controller circuit 56 includes a micro controller 57. A suitable micro controller 57 is a model number MC68HC908AP16 Micro-Controller Unit (MCU) made by Freescale Semiconductor, Inc. Terminals for a microprocessor 57 of the micro controller circuit 56 are described in Table 1 and a similar MCU may be used with appropriate connections.

TABLE 1

| Terminal | Signal |
| --- | --- |
| 1 | PTB6/T2CH0 |
| 2 | VREG |
| 3 | PTB5/T1CH1 |
| 4 | VDD |
| 5 | OSC1 |
| 6 | OSC2 |
| 7 | VSS |
| 8 | PTB4/T1CH0 |
| 9 | IRQ |
| 10 | PTB3/RxD |
| 11 | RST |
| 12 | PTB2/TxD |
| 13 | PTB1/SCL |
| 14 | PTB0/SDA |
| 15 | PTC7/SCRxD |
| 16 | PTC6/SCTxD |
| 17 | PTC5/SPSCK |
| 18 | PTC4/SS |
| 19 | PTC3/MOSI |
| 20 | PTC2/MISO |
| 21 | PTC1 |
| 22 | PTC0/IRQ2 |
| 23 | PTA7/ADC7 |
| 24 | PTA6/ADC6 |
| 25 | PTA5/ADC5 |
| 26 | PTA4/ADC4 |
| 27 | PTA3/ADC3 |
| 28 | PTA2/ADC2 |
| 29 | PTA1/ADC1 |
| 30 | PTA0/ADC0 |
| 31 | VREFL |
| 32 | VREFH |
| 33 | PTD7 |
| 34 | PTD6 |
| 35 | PTD5 |
| 36 | PTD4 |
| 37 | PTD3 |
| 38 | VSSA |
| 39 | VDDA |
| 40 | PTD2 |
| 41 | PTD1 |
| 42 | PTD0 |
| 43 | PTB7 |
| 44 | CGMXFO |

Pins on the micro controller 57 are connected as follows. Pins 1, 3, 10, 12, 13, 15, 16, 17, 18, 19, 22, 24, 26, 33, 35, 36, 40, 41, and 42 are not connected to elements of the micro controller circuit 56. The remaining pins are connected to:

Pin 2 is connected to ground through a 1 µf capacitor C10.

Pin 4 is connected to the 5 volt DC power signal 62.

Pin 5 is connected to a second pin of a connector J3 of a clock 59.

Pin 6 is connected to the clock 59.

Pin 7 is connected to ground.

Pin 8 is connected to the zero cross signal 63.

Pin 9 is connected to through a diode D1 (current toward pin 9) to the 5 volt DC power signal 62.

Pin 11 is connected through a 100K resister R15 to the 5 volt DC power signal 62.

Pin 14 is connected through a 10K resister R19 to ground.

Pin 20 is connected to the lamp out signal 66 (see FIG. 7).

Pin 21 is connected to the heater out signal 68 (see FIG. 7).

Pin 23 is connected to the sensor data signal 64 from the sensor data processor 54.

Pin 25 is connected to the current input signal 70 (see FIG. 7).

Pin 27 is connected through a 1K resister R40 and a 10K resister R38 to the 5 volt DC power signal 62.

Pin 28 is connected through a 10K resister R13 to ground.

Pin 29 is connected through a 22K resister R16 to the 5 volt DC power signal 62.

Pin 30 is connected through a 22K resister R11 to the 5 volt DC power signal 62.

Pin 31 is connected to ground.

Pin 32 is connected to ground through in-parallel 1 µf capacitor C13 and 0.1 µf capacitor C12.

Pin 34 is connected to the 5 volt DC power signal 62 through in-series 560 ohm resister R17 and red LED D10 (current toward pin 34).

Pin 37 is connected to the 5 volt DC power signal 62 through in-series 560 ohm resister R12 and yellow LED D7 (current toward pin 37).

Pin 38 is connected to ground.

Pin 39 is connected to the 5 volt DC power signal 62.

Pin 43 is connected to the 5 volt DC power signal 62 through in-series 560 ohm resister R5 and red LED D9 (current toward pin 43).

Pin 44 is connected to an RC circuit.

Figure 9:
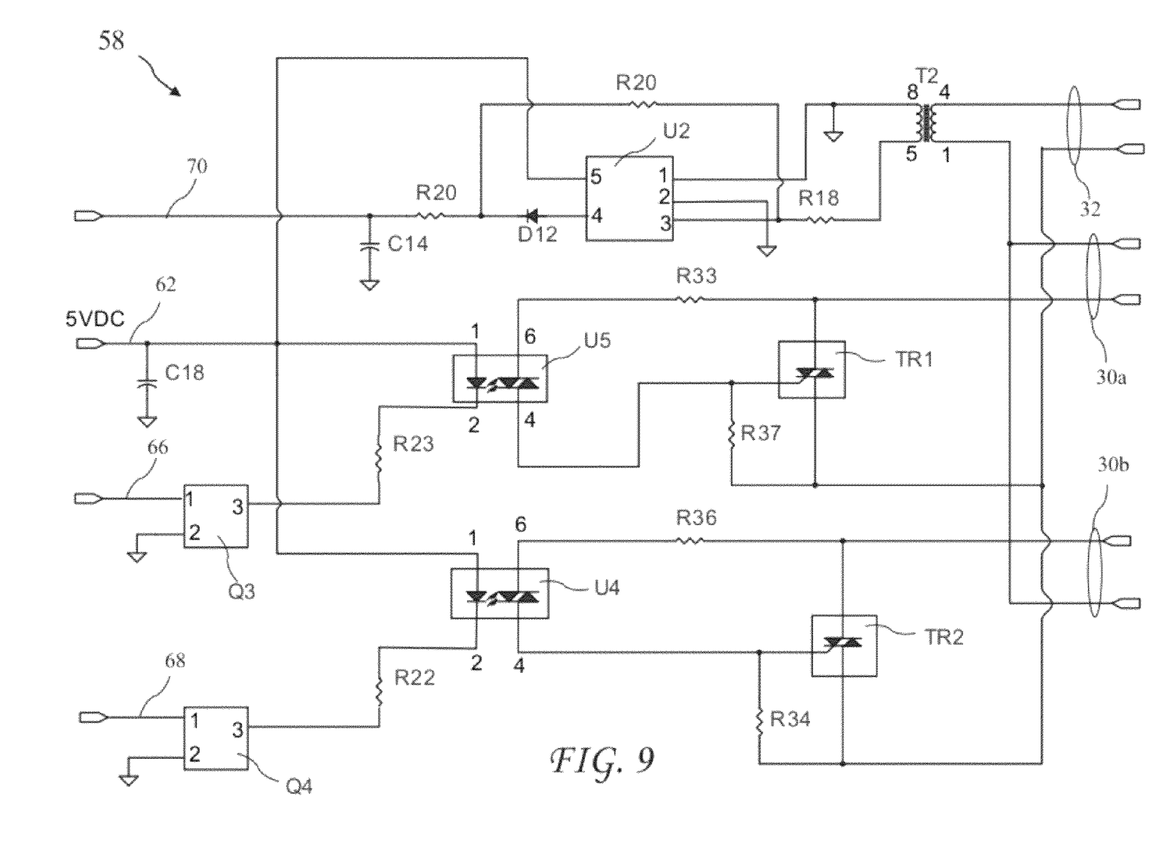
FIG. 9 is a power controller element of the control circuit.

A detailed diagram of the power controller 58 of the control circuit 50 is shown in FIG. 9. The power controller 58 receives AC power through wires 32 and the 5 volt DC power signal 62 from the power supply 52. The power controller 58 includes two high power triacs TR1 and TR2 utilizing phase power control to control the flow of electricity to the light source 22 and to a heat source 28*a*, 28*b*, or 28*c* (see FIGS. 4A, 4B, 4C) through wires 30*a* and 30*b* respectively. The concept of phase angle control is to apply only a portion of the ac waveform to the load. Once fired, the Triac will conduct until the next zero crossing. The average voltage is proportional to the shaded area under the curve. The phase angle is measured from the trigger point to the next zero crossing to provide precise control. Suitable triacs TR1 and TR2 are model BTA24-600BW triacs made by Snubberless & Standard in Carrollton, Tex.

The triacs TR1 and TR2 are controlled through isolators U5 and U4 respectively which isolate the high power switched by the triacs from the low voltage control circuit. Preferably, the isolators U5 and U4 are optoisolators, for example, model MOC3022 optoisolators made by Fairchild Semiconductor in South Portland, Me.

The optoisolators U4 and U5 receive the heater and lamp control signals 66 and 68 through bias resistor transistors Q3 and Q4. An example of suitable bias resistor transistors Q3 and Q4 is a model MUN5211 made by On Semiconductor in Phoenix, Ariz.

A second transformer T2 is connected in series with the AC power output to the heater 28 and the lamp 22 and the resulting signal is processed by the power controller 58 to provide current sensing. The sensed current signal is provided from the transformer T2 to an operational amplifier U2 and a rectifier comprising a switching diode D12 (for example a model RLS4148 switching diode made by ROHM Co. in Plano, Tex.), a 4.7K resister R20, and a 10K resister R18. The operational amplifier U2 is preferably a general purpose operational amplifier, for example, a model LMV321 made by National Semiconductor in Santa Clara, Calif. Output of the rectifier (the diode D12) is filtered using the resister R20 and a 1 µf capacitor C14 to provide a filtered output 70. The filtered output 70 is connected to channel 5 (pin 25) of the Analog to Digital converter on the micro controller 57. Software uses the filtered signal 70 to determine the health of the heater and the Lamp circuit.

Figure 10:
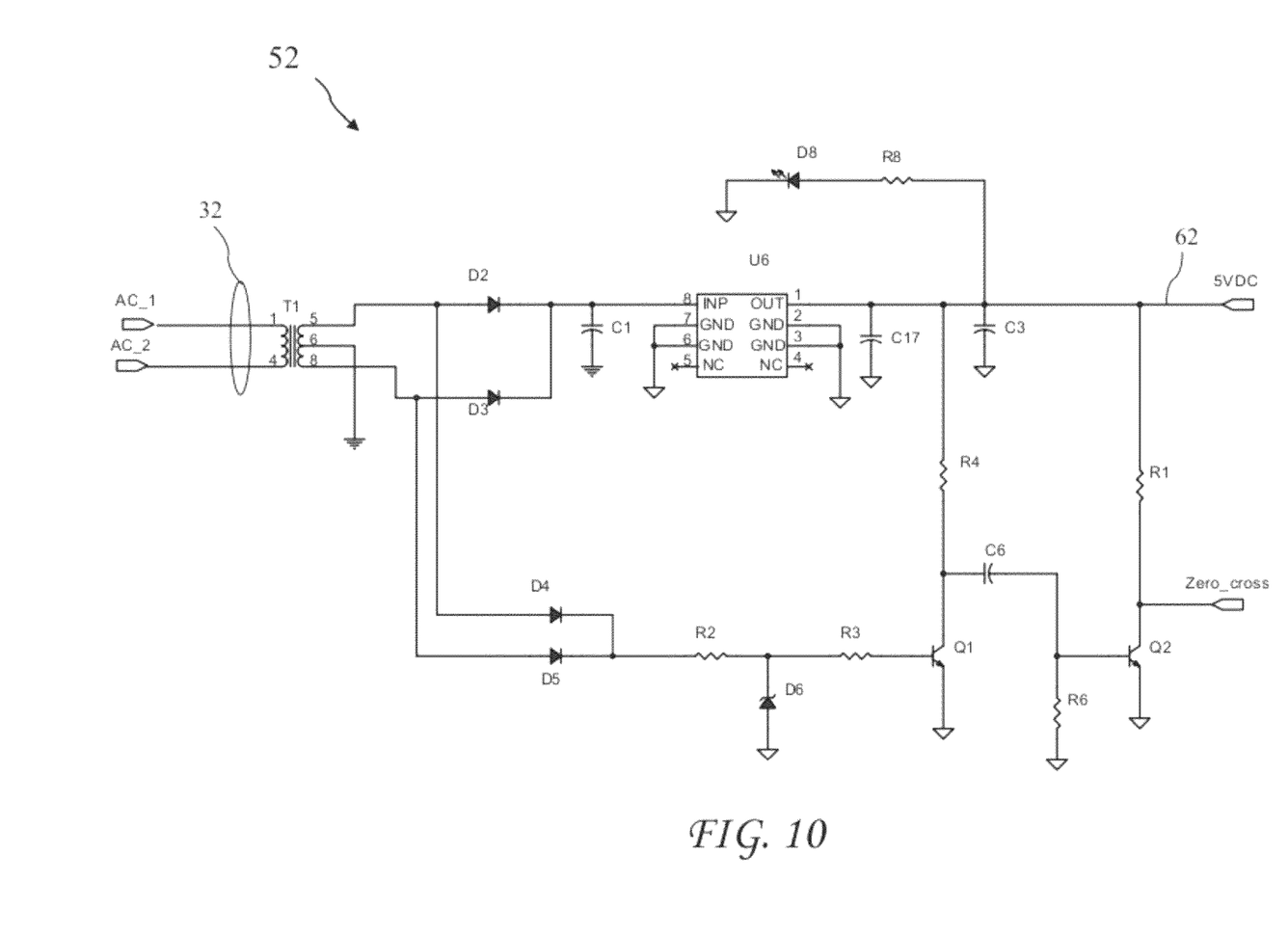
FIG. 10 is a power supply element of the control circuit.

A detailed diagram of the power supply 52 of the control circuit 50 is shown in FIG. 10. The power supply section 52 has two functions: provide the 5 volt DC signal for all of the circuits; and an AC line synchronization pulse for zero crossing circuit in the power controller 58 (see FIG. 9). A first transformer T1 is used as a step down transformer providing an eight volt AC signal and diodes D2 and D3 and 1000 µf capacitor C1 form a full way rectifier to provide a rectified DC power signal. An example of a suitable transformer T1 is a model SB2816-1614 made by Tamura Corp. with US offices in Temecula, Calif.

A 5V linear voltage regulator U6 with a 1000 µf capacitor C17 used as an output filter capacitor and a 0.33 µf capacitor C3 as high frequency rejection capacitor to provide the 5 volt DC power signal 62. Diodes D4 and D5 produce a full waveform on the base of a first NPN general purpose transistor Q1, the collector of Q1 goes low at every 180 of the 60 Hz input cycle. A 10K resistor R4, 0.01 µf capacitor C6, 100K resister R6 and second NPN general purpose transistor Q2 form a narrow pulse generator which is synchronized with the 60 Hz AC line frequency. The narrow pulses are used by the microprocessor 57 to generate the appropriate phase delay pulses to fire the triac devices TR1 and TR2 (see FIG. 9) used to control the power provided to heater and the lamp. An example of a suitable transistor Q1 is a model MMST3904 made by ROHM in Plano, Tex.

A diode D8 is connected to the 5 volt DC power signal 62 providing a Green LED used as a power available indicator.

Figures 11A, 11B:
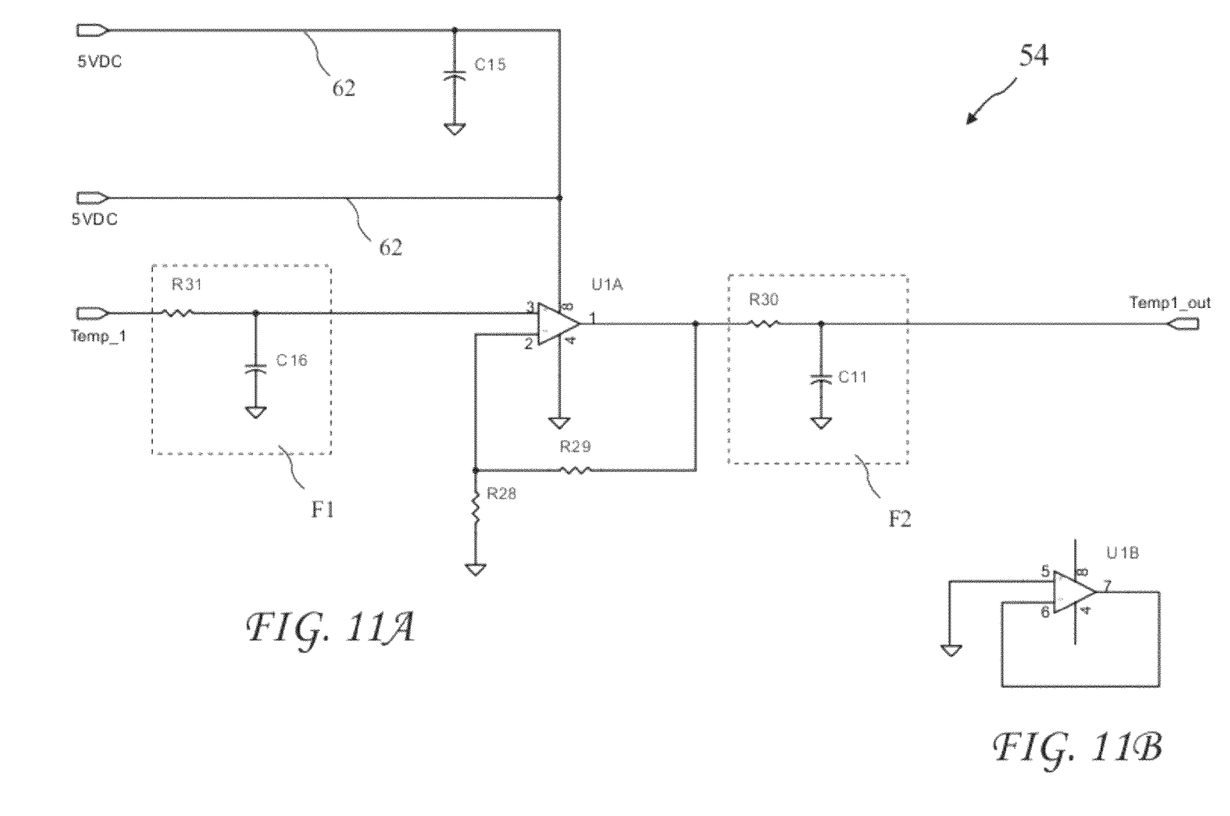
FIG. 11A is a sensor element of the control circuit.
FIG. 11B is an alternative embodiment of the sensor element of the control circuit.

A detailed diagram of the sensor data processor 54 of the control circuit 50 is shown. The liquid motion lamp 10 preferably includes a very accurate solid-state temperature sensor 42 embedded with the heater element in the Lava lamp, which sensor 42 is preferably a Resistive Thermal Device (RTD) sensor. Output of the sensor 42 is filtered through a first low pass filter F1 formed by a 4.7 K ohm resister R31 and a 0.33 µf capacitor C16. The low pass filter provides a very steep roll off to reduce noise in the system. An operational amplifier U1A is used as a multiply by two amplifier and very high impedance load for the filter. Output from the amplifier UA1 passes through a second filter F2 formed by a 10K ohm resister R30 and a 0.33 µf capacitor C11 to reduce or eliminate high frequency noise passed to the analog to digital converter inside the microprocessor 57.

Large lamps including the control circuit 40 also pose problems in blending the first liquid and in shipping. These issues are addressed in U.S. patent application Ser. No. 10/856,457, filed Jun. 1, 2004, for "LIQUID MOTION LAMP" filed by the applicant of the present invention and incorporated above by reference.

While the invention herein disclosed has been described by means of specific embodiments and applications thereof, numerous modifications and variations could be made thereto by those skilled in the art without departing from the scope of the invention set forth in the claims.

I claim:

1. A liquid motion lamp comprising:
   a container;
   a first liquid suitable for residing in the container;
   a second liquid residing in the container and forming a heterogenous mixture with the first liquid, wherein:
     the first liquid has a greater density than the second liquid at a lower temperature; and
     the first liquid has a lesser density than the second liquid at a higher temperature;
   a base, at least a portion of which is below the container;
   a heat source heating the second liquid;
   a high efficiency non-incandescent light source residing within the base and projecting light into the container to illuminate the liquids, the high efficiency light source providing an insignificant amount of heat to the second liquid;

a temperature sensor measuring the temperature of at least one of the second liquid and of an ambient temperature in the area the lamp is located; and a control circuit receiving temperature measurements from the temperature sensor and controlling the power provided to the heat source to affect the temperature of the liquids in the container.

2. The liquid motion lamp of claim 1, wherein the heat source is a first heat source and the lamp further including a second lower power heat source and the power to the heat sources is controlled independently.

3. The liquid motion lamp of claim 2, wherein:

a clear container bottom closes the bottom of the container;

the second heat source is a heat blanket residing under the container bottom; and the light source resided under the heat pad and the heat pad includes ports allowing light from the light source to enter the container through the container bottom.

4. The liquid motion lamp of claim 3, wherein the heat blanket covers the entire container bottom.

5. The liquid motion lamp of claim 3, wherein a thermal insulator resides under the heat blanket to hold heat in the lamp.

6. The liquid motion lamp of claim 2, wherein the first heat source is immersed in the second liquid.

7. The liquid motion lamp of claim 6, wherein:

the first heat source is a higher power heat source than the second heat source and provides heat for initially heating the lamp; and the temperature sensor is thermally connected to the first heat source to sense a high temperature and turn the lamp off if the second liquid is not covering the first heater.

8. The liquid motion lamp of claim 1, wherein the high efficiency non-incandescent light source is an LED.

9. The liquid motion lamp of claim 8, wherein:

the LED is an Ultra Violet (UV) LED; and the liquids include UV dye for cooperation with the UV LED.

10. The liquid motion lamp of claim 9, wherein the dye comprise an oil soluble dye and a water base UV dye thereby retaining separation of colors during operation of the liquid motion lamp.

11. The liquid motion lamp of claim 1, wherein the power consumption of the high efficiency non-incandescent light source is approximately 4.55 watts per gallon of the liquids in the lamp to provide visual effects similar to known lamps using incandescent light sources.

12. The liquid motion lamp of claim 1, wherein the power consumption of the high efficiency non-incandescent light source is approximately 9.1 watts per gallon of the liquids in the lamp to provide significantly improved visual effects compared to known lamps using incandescent light sources.

13. The liquid motion lamp of claim 1, wherein the light source is controlled to follow music.

14. A liquid motion lamp comprising:

a container;

a clear container bottom closing the bottom of the container;

a first liquid suitable for residing in the container;

a second liquid residing in the container and forming a heterogenous mixture with the first liquid, wherein:

the first liquid has a greater density than the second liquid at a lower temperature; and the first liquid has a lesser density than the second liquid at a higher temperature;

a base, at least a portion of which is below the container;

a first higher power heat source heating the second liquid for initial heating of the lamp;

a second lower power heat source residing under the contain bottom and heating the second liquid for sustained operation;

a high efficiency LED light source residing within the base and projecting light through the container bottom and into the container to illuminate the liquids;

a temperature sensor measuring the temperature of the second liquid; and a control circuit receiving temperature measurements from the temperature sensor and independently controlling the power provided to the first heat source for initially heating the lamp and to the second heat source for maintaining the temperature of the lamp to affect the temperature of the liquids in the container.

15. A method for controlling a liquid motion lamp, the method comprising:

turning on the liquid motion lamp;

measuring a sensor temperature Ts of liquid in a container of the liquid motion lamp;

comparing Ts to a minimum preferred temperature T1;

If Ts is less than T1, providing full power to a first higher power heat source of the liquid motion lamp, and again performing:

measuring the temperature Ts; and comparing the temperature Ts to a minimum preferred temperature T1;

if the temperature Ts is not less than the temperature T1:

turning power off to the first heat source;

turning power on to a second lower power heat source; and turning power on to a high efficiency lighting element of the liquid motion lamp;

again measuring the sensor temperature Ts;

again comparing the temperature Ts is to the temperature T1;

if Ts is less than T1, turning full power on to the first heat source;

If Ts is not less than T1, the temperature Ts is compared to a maximum operating temperature Tmax;

if Ts is greater than Tmax, the liquid motion lamp is turned off;

If Ts is less than Tmax, performing:

turning power off to the first heat source;

computing a delta-T between Ts and a maximum preferred temperature, T2;

providing power to the second heater computed as a constant K times delta_T; and again measuring the temperature Ts and comparing Ts to T1 and Tmax and subsequent steps.

16. The method of claim 15, wherein providing power to the first heat source comprises providing power to the first heat source submerged in the liquids.

17. The method of claim 15, further including controlling the high efficiency lighting element to follow music.

18. The method of claim 15, further including watching the behavior of the first liquid in the lamp and adjusting T2 to provide desired motion.

19. The method of claim 18, wherein T2 is adjusted to be between 110 degrees Fahrenheit and 120 degrees Fahrenheit.

* * * * *